M. R. SCHAFFER.
CRANK SHAFT BALANCE.
APPLICATION FILED SEPT. 25, 1920.
1,383,488.
Patented July 5, 1921.
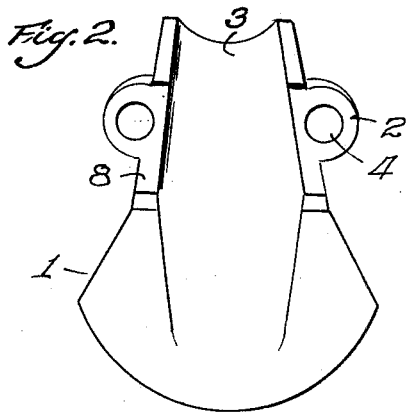
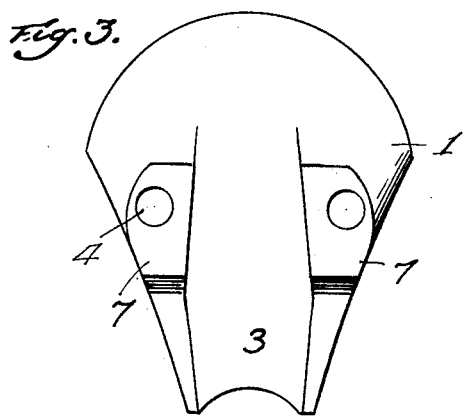
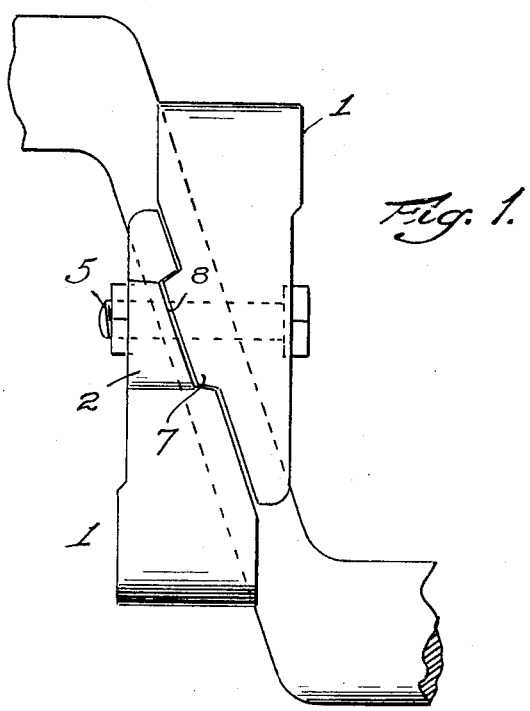
MARTIN R. SCHAFFER, Inventor
By *Ed. A. Kell.*
Attorney

UNITED STATES PATENT OFFICE.

MARTIN R. SCHAFFER, OF READING, PENNSYLVANIA.

CRANK-SHAFT BALANCE.

1,383,488. Specification of Letters Patent. Patented July 5, 1921.

Application filed September 25, 1920. Serial No. 412,891.

*To all whom it may concern:*

Be it known that I, MARTIN R. SCHAFFER, a citizen of the United States, residing at Reading, in the county of Berks and State of Pennsylvania, have invented certain new and useful Improvements in Crank-Shaft Balances, of which the following is a specification.

This invention relates to improvements in crank shaft balances, and while it is intended more particularly for use on the crank shafts of engines, it is to be understood that the invention is equally applicable in many other instances where a balance of this character is desired.

The invention consists of a balance device, made up of two substantially identical weight or balance members, adapted, as is usual in such cases, to be applied to diametrically opposed points on the shaft, and secured in the usual manner, as by bolts or screws.

In the present invention however, I have gone a step farther than this, in that I have made the two balance members in such manner, that, when applied to the shaft, they are not only held together by bolts, but that they actually engage each other, and moreover, that this engagement of one member with the other, serves as a lock against any lateral movement, that is, any relative movement as between the two balance members; and, by this construction the danger of shearing off the bolts is entirely eliminated and all strain on said bolts is removed, so that the bolts serve only as a means of tying the two members together, and that their positive engagement, one with the other, is accomplished by the male and female locking members formed on the balance pieces.

The invention is more fully described in the following specification and clearly illustrated in the accompanying drawing, in which:—

Figure 1 is a side elevational view of my balance as it appears when applied to a shaft.

Fig. 2 is an elevational view showing the inner surface of the female member and Fig. 3 a like view of the male member.

The numeral 1 designates the body portion of the weight or balance members, which body is, in both the male and female members, considerably heavier at one end than the other.

Each member is formed with a substantially semi-circular groove 3 extending centrally of its entire length, and with an ear 2 at each side of the member, which ears are perforated as shown at 4, to receive the securing bolts 5 when they are in position on the shaft.

The male member is formed with two oppositely disposed lugs 7, substantially on a line across the medial line of the perforated ears, and the female member is formed with a pair of depressions or grooves 8, adapted to receive the lugs 7 when the two members are placed in position on a shaft.

This engagement of the lugs of one member with the grooves on the opposite member, will serve to hold the two members against any side movement, and when secured together, by the bolts 5 as shown in Fig. 1, the only function of these bolts will be to tie the two members together, as all strain on the bolts due to relative movement of the members 1, will be relieved by or through this engagement of the lugs, and a considerably lighter bolt may be used, thus reducing the weakness due to bolt holes to a minimum.

It is evident that the particular form or contour of the balance members may be varied, as may obviously their weight and size, and that the exact form of locking means as between the two members may be varied without departing from the spirit of the invention disclosed.

Having thus fully described my invention, what I claim and desire to secure by Letters Patent is:—

1. In a crank shaft balance, the combination of a shaft, a pair of balance members adapted to be secured to said shaft in opposed relative relation, one of said members having a pair of depressions and the opposite member having a pair of lugs adapted to register with said depressions when the two members are placed in proper position on the shaft.

2. In a crank shaft balance, the combination of a shaft, a pair of weighted balance members, means for securing said balance members on the shaft in opposed relation, one of said members being formed with a pair of lugs and the other with a pair of depressions adapted to receive said lugs, ears on opposite sides of each member and bolts passing through the ears and securing the two members together.

In testimony whereof I affix my signature.

MARTIN R. SCHAFFER.